(12) United States Patent
Kim

(10) Patent No.: US 12,496,082 B2
(45) Date of Patent: Dec. 16, 2025

(54) MULTI-FOCAL SHOCKWAVE OUTPUT HANDLE UNIT FOR EXTRACORPOREAL SHOCKWAVE THERAPY DEVICE USING MULTI-PIEZOELECTRIC CONFIGURATION

(71) Applicant: KIMED GLOBAL INC., Seoul (KR)

(72) Inventor: Sangsik Kim, Seoul (KR)

(73) Assignee: K1MED GLOBAL INC., Seoul (KR)

( * ) Notice: Subject to any disclaimer, the term of this patent is extended or adjusted under 35 U.S.C. 154(b) by 77 days.

(21) Appl. No.: 18/437,279

(22) Filed: Feb. 9, 2024

(65) Prior Publication Data
US 2024/0299054 A1 Sep. 12, 2024

Related U.S. Application Data

(63) Continuation of application No. PCT/KR2023/004801, filed on Apr. 10, 2023.

(30) Foreign Application Priority Data

Mar. 9, 2023 (KR) .................. 10-2023-0031354

(51) Int. Cl.
*A61B 17/225* (2006.01)
*A61B 17/00* (2006.01)
*B06B 1/06* (2006.01)

(52) U.S. Cl.
CPC ........ *A61B 17/2251* (2013.01); *B06B 1/0637* (2013.01); *A61B 2017/0046* (2013.01); *A61B 2017/2253* (2013.01); *B06B 2201/76* (2013.01)

(58) Field of Classification Search
CPC ........ A61B 17/2251; A61B 2017/0046; A61B 2017/2253
See application file for complete search history.

(56) References Cited

U.S. PATENT DOCUMENTS 9,039,624 B2 * 5/2015 Scheirer ............... G10K 11/004
                                                    600/407
9,510,802 B2 * 12/2016 Barthe ................... A61B 8/467
(Continued)

FOREIGN PATENT DOCUMENTS

| KR | 10-1487497 B1 | 1/2015 |
| KR | 10-2019-0127348 A | 11/2019 |
| KR | 10-2410514 B1 | 6/2022 |

OTHER PUBLICATIONS

International Search Report for PCT/KR2023/004801 mailed Nov. 29, 2023 from Korean Intellectual Property Office.

*Primary Examiner* — Baisakhi Roy
(74) *Attorney, Agent, or Firm* — Revolution IP, PLLC

(57) ABSTRACT

A multi-focal shockwave output handle unit for an extracorporeal shockwave therapy device using a multi-piezoelectric configuration includes a high-intensity focused ultrasound generator that is provided on a front end part of a handle that is provided to be gripped by a user, and generates high-intensity focused ultrasound (HIFU) on the basis of an applied electric signal; a cover unit that is connected to the front end part of the handle; a radiation-surface base unit that is connected to a front end part of the cover unit; a piezoelectric ceramic unit that includes a plurality of piezoelectric ceramic members arranged on the front inner curved surface of the cover unit or the rear outer curved surface of the radiation-surface base unit; and a gel pad unit that is connected to a front end part of the radiation-surface base unit.

5 Claims, 8 Drawing Sheets

(56) References Cited

U.S. PATENT DOCUMENTS

| | | | |
|---|---|---|---|
| 10,603,521 B2 * | 3/2020 | Emery | A61N 7/02 |
| 2009/0163836 A1 * | 6/2009 | Sliwa | A61N 7/02 |
| | | | 601/1 |
| 2009/0240148 A1 * | 9/2009 | Jeong | A61B 8/4483 |
| | | | 600/439 |

* cited by examiner

MULTI-FOCAL SHOCKWAVE OUTPUT HANDLE UNIT FOR EXTRACORPOREAL SHOCKWAVE THERAPY DEVICE USING MULTI-PIEZOELECTRIC CONFIGURATION

CROSS REFERENCE TO RELATED APPLICATIONS

This application is a Continuation of PCT International Patent Application No. PCT/KR2023/004801 filed on Apr. 10, 2023, which claims priority to Korean Patent Application No. 10-2023-0031354 filed on Mar. 9, 2023 which are all hereby incorporated by reference in their entirety.

BACKGROUND OF THE INVENTION

The present invention relates to a multi-focal shockwave output handle unit for an extracorporeal shockwave therapy device using a multi-piezoelectric configuration.

Extracorporeal shockwave devices are mainly used for treatment of kidney stones, urinary stones, and musculoskeletal diseases, and are divided into an extracorporeal shockwave lithotripsy (ESWL) device and an extracorporeal shockwave therapy (ESWT) device depending on the purpose of use.

Such extracorporeal shockwave lithotripsy and extracorporeal shockwave therapy devices are capable of non-invasively transmitting shockwaves generated outside the body to remove stones in the urinary tract and kidneys and help relaxation of muscles to treat musculoskeletal diseases.

Specifically, a core mechanism that produces biotherapeutic effects based on these devices is a cavitation phenomenon that when a shockwave is delivered to a medium containing water, bubbles are instantly created and ruptured by gas in the water due to a pressure change of the shockwave. The cavitation phenomenon occurs inside muscles or stones that have become calcified in the body when the shockwave is generated, thereby causing disintegration and collapse of sediments to aid the treatment.

Here, the extracorporeal shockwave therapy device generates shockwaves and applies mechanical stimulation to the inside of the body for the purpose of relieving pain. In the case of devices of a piezoelectric type, shockwaves are generated in the piezoelectric type and applied to the inside of the body, thereby relieving pain of the musculoskeletal system.

In the case of the piezoelectric-type extracorporeal shockwave therapy device, there are several limitations and problems in practical use for patients in a process of performing treatment through output of shockwaves based on a single focus, and thus, there is a need to overcome the above-mentioned limitations and problems.

In this regard, "MULTIFOCAL EXTRACORPOREAL SHOCK WAVE THERAPY DEVICE" disclosed in Korean Patent Registration No. 10-2410514 (hereinafter, referred to as 'the prior art') provides a technique capable of performing shockwave treatment without difficulty with only one type of gel pad and performing stereoscopic shockwave treatment by changing a shockwave focus during use.

However, in the case of the existing piezoelectric-type extracorporeal shockwave therapy devices, including the prior art, since the scope of application of a single focus is simply expanded or reduced, there is a problem in that it is difficult to produce various types and levels of ultrasound output according to various parts of the body and pain levels through diversification of the focus.

SUMMARY OF THE INVENTION

The present invention has been made in view of the above problems, and it is an object of the present invention to provide a multi-focal shockwave output handle unit for an extracorporeal shockwave therapy device using a multi-piezoelectric configuration, capable of adaptively changing the shape of an ultrasound stimulation area and an output voltage level thereof to suit a body portion to be treated and the degree of pain in the portion.

In order to achieve the above and other objects, according to an aspect of the present invention, there is provided a multi-focal shockwave output handle unit for an extracorporeal shockwave therapy device using a multi-piezoelectric configuration, including: a high-intensity focused ultrasound generator that is provided on a front end part of a handle that is provided to be gripped by a user, and generates high-intensity focused ultrasound (HIFU) on the basis of an applied electric signal to form a first ellipsoidal ultrasound stimulation area in a predetermined range with reference to a single focus on a front side; a cover unit that is connected to the front end part of the handle in a state where the high-intensity focused ultrasound generator is inserted in a first insertion hole formed at a central part thereof, is provided in the form of a spherical tube with a predetermined curvature, and covers a side part of the high-intensity focused ultrasound generator inserted through the first insertion hole on the inside of a front part thereof; a radiation-surface base unit that is connected to a front end part of the cover unit in a state where the high-intensity focused ultrasound generator is inserted in a second insertion hole formed at a central part thereof, is provided in the form of a spherical tube with a predetermined curvature, and surrounds the side of the high-intensity focused ultrasound generator inserted through the second insertion hole on the inside of a front part thereof to form a predetermined space between a rear outer curved surface and a front inner curved surface of the cover unit; a piezoelectric ceramic unit that includes a plurality of piezoelectric ceramic members arranged on the front inner curved surface of the cover unit or the rear outer curved surface of the radiation-surface base unit having a spherical tube shape, and generates ultrasonic waves on the basis of an applied electric signal; and a gel pad part that is connected to a front end part of the radiation-surface base unit in a state where the high-intensity focused ultrasound generator is inserted in a third insertion hole formed at a central part thereof, surrounds the side of the high-intensity focused ultrasound generator, and provides a skin contact surface at a front part thereof, in which the ultrasonic waves generated by the plurality of piezoelectric ceramic members arranged on the front inner curved surface of the cover unit or the rear outer curved surface of the radiation-surface base unit of the spherical tube shape pass through the radiation surface base unit and the gel pad part 160 to form a ring-shaped second ultrasound stimulation area within a predetermined range with reference to multiple focuses on the front side by the curvature of the curved surface.

Here, a maximum output voltage of the second ultrasound stimulation area provided by the plurality of piezoelectric ceramic units may be set to 10% to 40% of a maximum output voltage of the first ultrasound stimulation area provided by the high-intensity focused ultrasonic generator.

Further, when the plurality of piezoelectric ceramic members are arranged in a plurality of rows from the front to the back on the front inner curved surface of the cover unit or the rear outer curved surface of the radiation-surface base unit of the spherical tube shape, a slope of a radiation angle at which ultrasonic waves are generated increases with respect to a plane where the second ultrasound stimulation area is formed as the position of each piezoelectric ceramic member goes backwards.

In addition, the piezoelectric ceramic unit may be provided with 60 to 120 piezoelectric ceramic members, which are arranged on the front inner curved surface of the cover unit or the rear outer curved surface of the radiation-surface base unit of the spherical shape.

Further, the curvature of the front inner curved surface of the cover unit or the rear outer curved surface of the radiation-surface base unit may be set so that the ring-shaped second ultrasound stimulation area formed by the plurality of piezoelectric ceramic members arranged thereon has an outer diameter of 5 mm to 30 mm and an inner diameter of 1 mm to 20 mm.

The maximum output voltage of the second ultrasound stimulation area formed through the ultrasound generation of the piezoelectric ceramic unit may correspond to 25 mV to 105 mV.

The multi-focal shockwave output handle unit may further include a control unit that is provided inside the handle and performs a control for applying the electric signal for generating the ultrasonic waves to at least one of the high-intensity focused ultrasound generator or the piezoelectric ceramic unit.

According to the present invention, the following effects are achieved.

First, using at least one of the first ultrasound stimulation area with reference to a single focus or the ring-shaped second ultrasound stimulation area with reference to multiple focuses, it is possible to selectively apply an appropriate stimulation area to suit a body portion to be treated and the degree of pain therein.

Second, using the first ultrasound stimulation area with reference to the single focus, it is possible to penetrate deeply into the skin to achieve ultrasound stimulation of the musculoskeletal system, and using the ring-shaped second ultrasound stimulation area with reference to the multiple focuses, it is possible to penetrate shallowly into an epidermal layer with a low energy density.

Third, since it is possible to intensively stimulate a specific area using the first ultrasound stimulation area with reference to the single focus, and broadly stimulate the epidermal layer using the ring-shaped second ultrasound stimulation area with reference to the multiple focuses, when performing rubbing with the hands, a user is capable of effectively stimulate a wide area by widening a space between the hands.

BRIEF DESCRIPTION OF DRA WINGS

Exemplary embodiments of the present invention will be described in detail based on the following figures, wherein.

Figure 7:
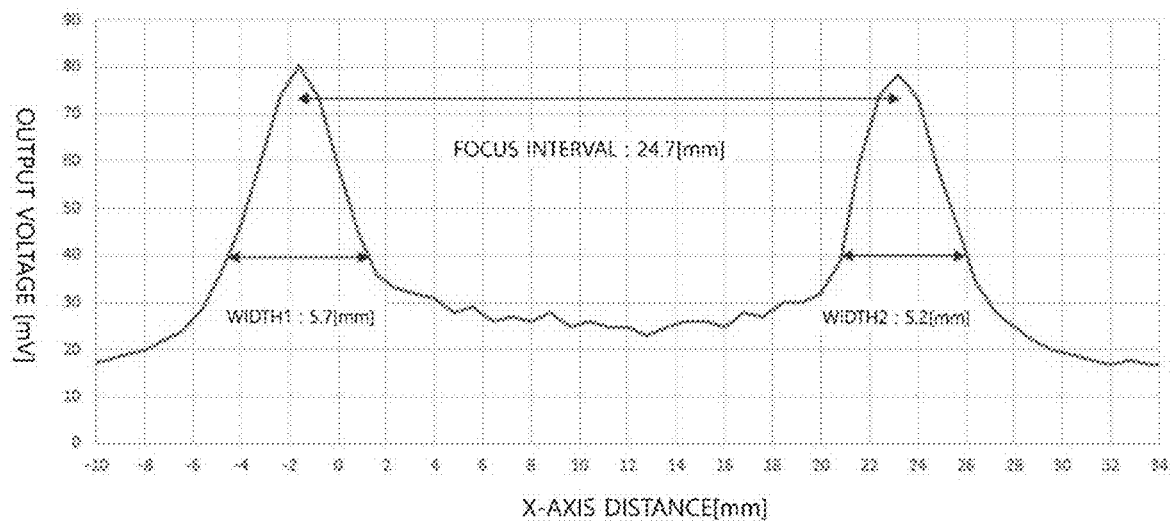
Figure 8:
Figure 9:
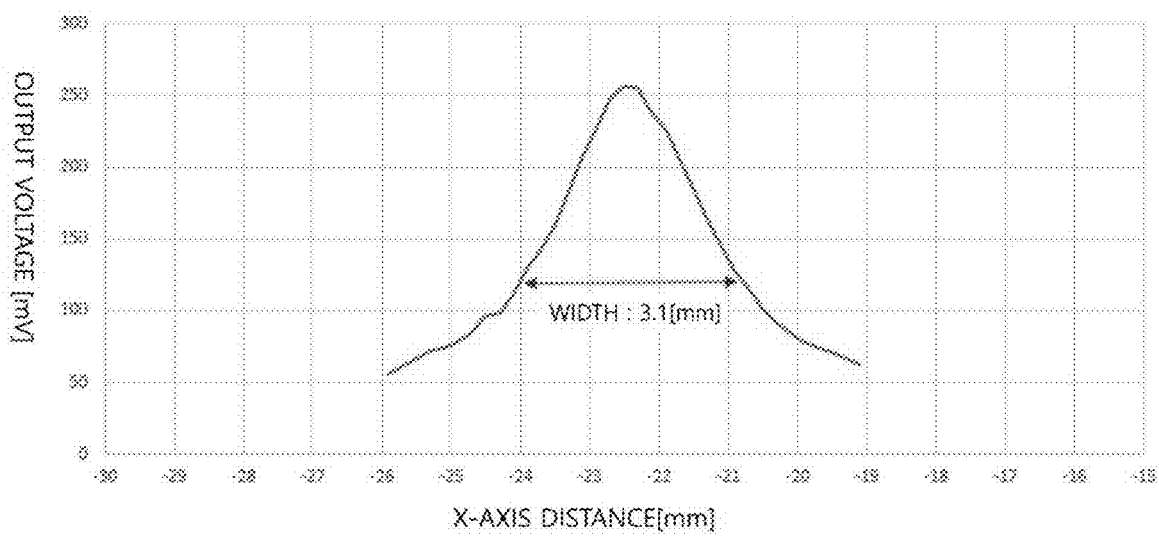
Figure 10:
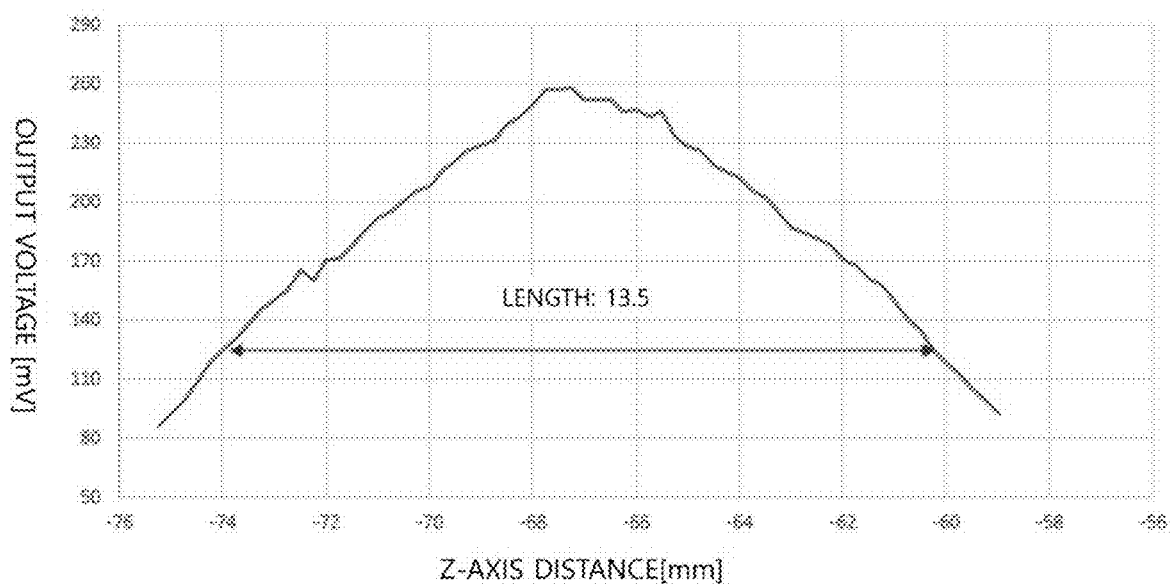

FIGS. 7 and 8 are graphs showing results of the experiment to measure the range of the second ultrasound stimulation area and the output voltage using the multi-focal shockwave output handle unit for the extracorporeal shockwave therapy device according to the embodiment of the present invention; and FIGS. 9 and 10 are graphs showing results of an experiment to measure a range of an ultrasound stimulation area and an output voltage using a shockwave output handle unit for a conventional extracorporeal shockwave therapy device.

DETAILED DESCRIPTION OF THE INVENTION

Preferred embodiments of the present invention will be described in detail with reference to the accompanying drawings, but description of well-known technical configurations will be omitted or simplified for ease of description.

Figure 1:
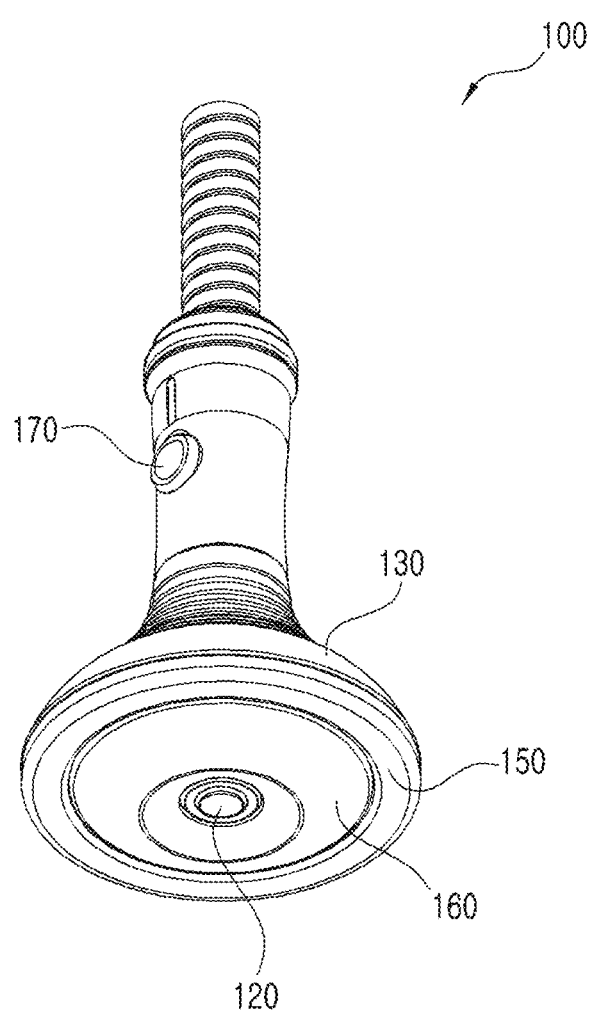
FIG. 1 is a perspective view showing a structure of a multi-focal shockwave output handle unit for an extracorporeal shockwave therapy device according to an embodiment of the present invention.
Figure 2:
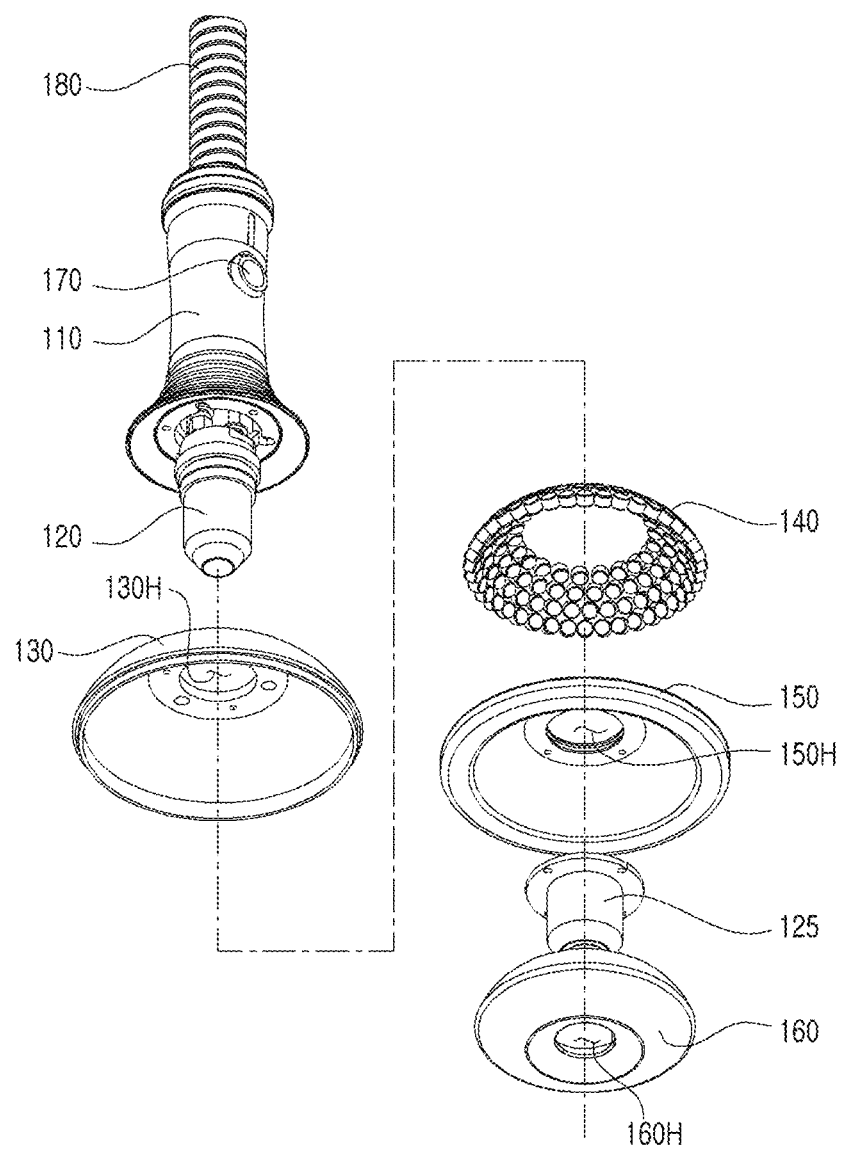
FIG. 2 is an exploded perspective view showing a configuration of the multi-focal shockwave output handle unit for the extracorporeal shockwave therapy device according to the embodiment of the present invention.

Referring to FIGS. 1 and 2, a multi-focal shockwave output handle unit 100 for an extracorporeal shockwave therapy device using a multi-piezoelectric configuration according to an embodiment of the present invention includes a handle 110 that enables selective provision of at least one of a first ultrasound stimulation area based on a single focus or a ring-shaped second ultrasound stimulation area based on multiple focuses, a high-intensity focused ultrasound generator 120, a cover unit 130, a piezoelectric ceramic unit 140, a radiation-surface base unit 150, a gel pad unit 160, a control unit 170, and a hose unit 180.

The handle 110 is provided to be gripped by a user who wants to perform treatment using the multi-focal shockwave output handle unit 100 for the multi-piezoelectric type extracorporeal shockwave therapy device according to the present embodiment, in which a grip space is provided on the outside thereof. Further, the handle 110 has a configuration in which components related to ultrasound generation are provided on a front side thereof and the control unit 170 (which will be described later) is also provided therein.

Further, the hose unit 180 is connected to a rear side of the handle 110, in which a cable for electrical connection with a main body (not shown) of the extracorporeal shockwave therapy device is provided to be connected to the control unit 170.

The high-intensity focused ultrasound generator 120 is mounted at a front end part of the handle 110, and generates high-intensity focused ultrasound (HIFU) on the basis of an applied electrical signal to provide a first ultrasound stimulation area (S1) of an ellipsoid shape formed within a predetermined range with reference to a single focus on the front side.

Figure 3:
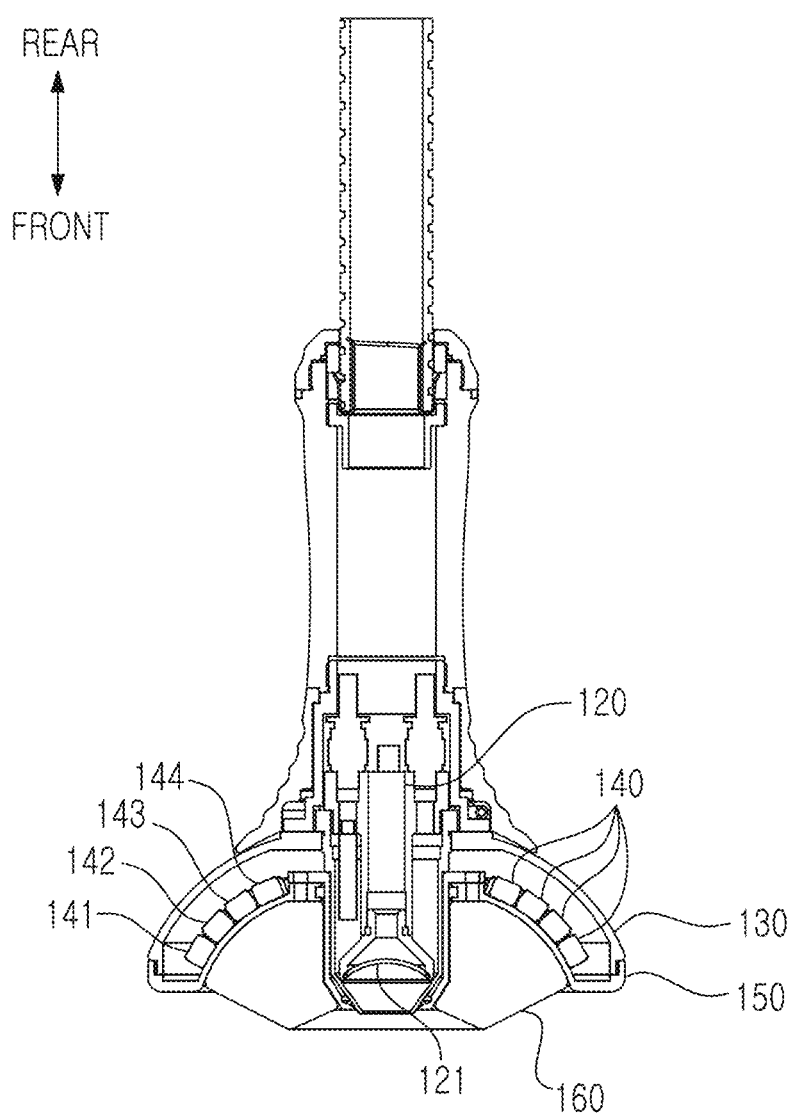
FIG. 3 is a cross-sectional view showing a connection state of components of the multi-focal shockwave output handle unit for the extracorporeal shockwave therapy device according to the embodiment of the present invention.
Figure 4:
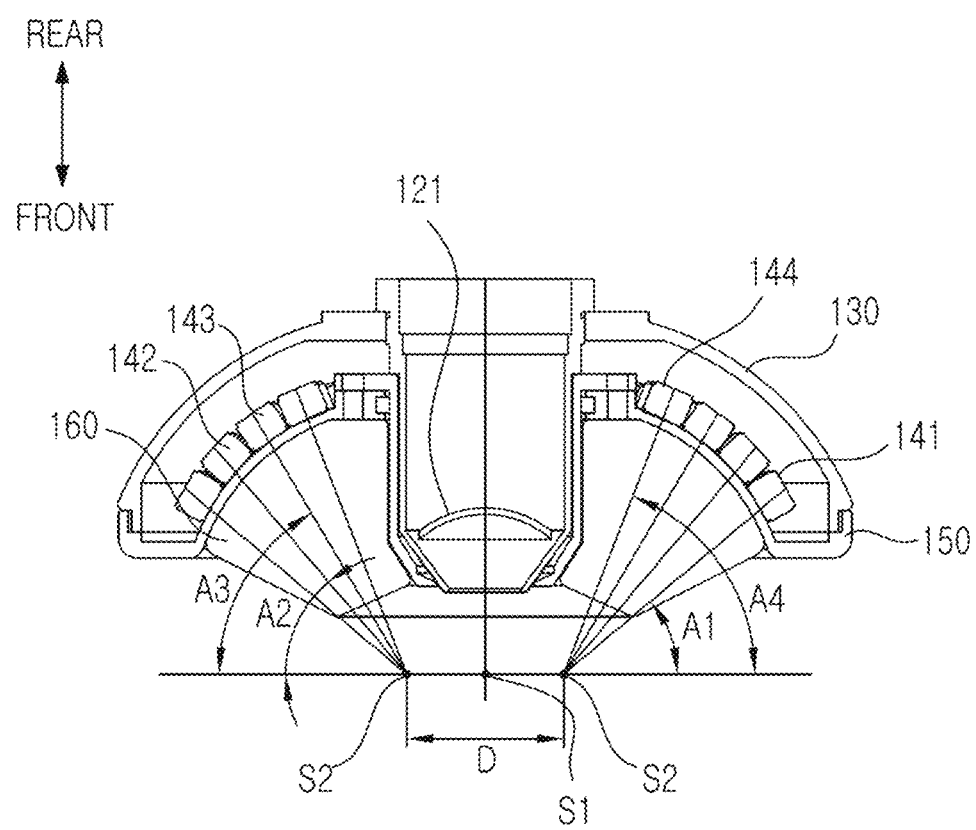
FIG. 4 is a cross-sectional view for illustrating provision of an ultrasound stimulation area through a high-intensity focused ultrasound generator and a plurality of piezoelectric ceramic members in the multi-focal shockwave output handle unit for the extracorporeal shockwave therapy device according to the embodiment of the present invention.

Further, as shown in FIGS. 3 and 4, in order to cause the high-intensity focused ultrasound generator 120 to generate the high-intensity focused ultrasound (HIFU) to provide the ellipsoidal first ultrasound stimulation area (S1) formed within the predetermined range with reference to the single focus on the front side, a hemispherical or spherical tube type piezoelectric ceramic member 121 is provided.

Here, the first ultrasound stimulation area (S1) provided through the high-intensity focused ultrasound generator 120 may include a complete ellipsoidal shape, and preferably, may include a shape close to an ellipsoid with different X, Y, and Z-axis radii with reference to a single focus.

Specifically, the first ultrasound stimulation area (S1) provided through the high-intensity focused ultrasound generator 120 may penetrate deeply into the skin to cause treatment through ultrasonic stimulation in the musculoskeletal system. To this end, it is preferable that a maximum output voltage is set to 200 mV to 300 mV, a penetration depth, which is defined as the size of a focus at a point showing a 50% decrease compared with the maximum output voltage, is set to 1 mm to 20 mm.

Here, the high-intensity focused ultrasound generator 120 is inserted into a hollow shield member 125 so that a side part thereof is shielded.

The cover unit 130 is connected to a front end part of the handle 110 in a state where the high-intensity focused ultrasound generator 120 is inserted in a first insertion hole 130H formed at a central part thereof, as shown in FIG. 2, and is provided in the form of a spherical tube with a predetermined curvature.

In a state where the cover unit 130 is connected to the front end part of the handle 110, the cover unit 130 covers a side part of the high-intensity focused ultrasound generator 120 inserted through the first insertion hole 130H on the inside of a front part thereof.

As shown in FIG. 2, the radiation-surface base unit 150 is connected to a front end part of the cover unit 130 in a state where the high-intensity focused ultrasound generator 120 is inserted in a second insertion hole 150H formed at a central part thereof, and is provided in the form of a spherical tube with a predetermined curvature.

In a state where the radiation-surface base unit 150 is connected to the front end part of the cover unit 130, the radiation-surface base unit 150 surrounds the side of the high-intensity focused ultrasound generator 120 inserted through the second insertion hole 150H on the inside of a front part thereof.

Here, a predetermined space is formed between a rear outer curved surface of the radiation-surface base unit 150 and a front inner curved surface of the cover unit 130, and the piezoelectric ceramic unit 140 (which will be described below) is adhesively provided in the space.

The gel pad unit 160 is connected to a front end part of the radiation-surface base unit 150 in a state where the high-intensity focused ultrasound generator 120 is inserted in a third insertion hole 160H formed at a central part thereof, surrounds the side of the high-intensity focused ultrasound generator 120 or the shield member 125, and provides a skin contact surface at a front part thereof.

Accordingly, a part that actually comes into contact with the skin of a patient becomes the front surface of the gel pad unit 160.

Figure 5:
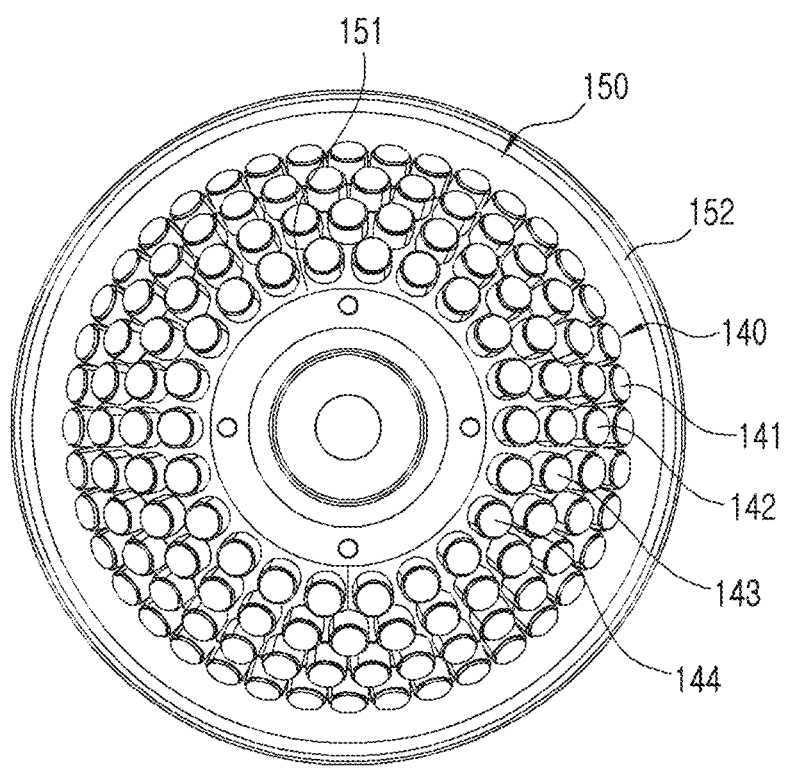
FIG. 5 is a plan view showing an arrangement of the plurality of piezoelectric ceramic members in the multi-focal shockwave output handle unit for the extracorporeal shockwave therapy device according to the embodiment of the present invention.

The piezoelectric ceramic unit 140 is a piezoelectric ceramic module including a plurality of piezoelectric ceramic members that generate ultrasonic waves on the basis of an applied electric signal and are arranged on the front inner curved surface of the cover unit 130 or the rear outer curved surface of the radiation-surface base unit 150, which has the spherical tube shape, as shown in FIG. 5.

Specifically, the piezoelectric ceramic members of the piezoelectric ceramic unit 140 are adhesively arranged one by one on the front inner curved surface of the cover unit 130 or the rear outer curved surface of the radiation-surface base unit 150 of the spherical tube shape, and are arranged in a radial form in multiple rows from the front to the back, as shown in FIG. 5.

Figure 6:
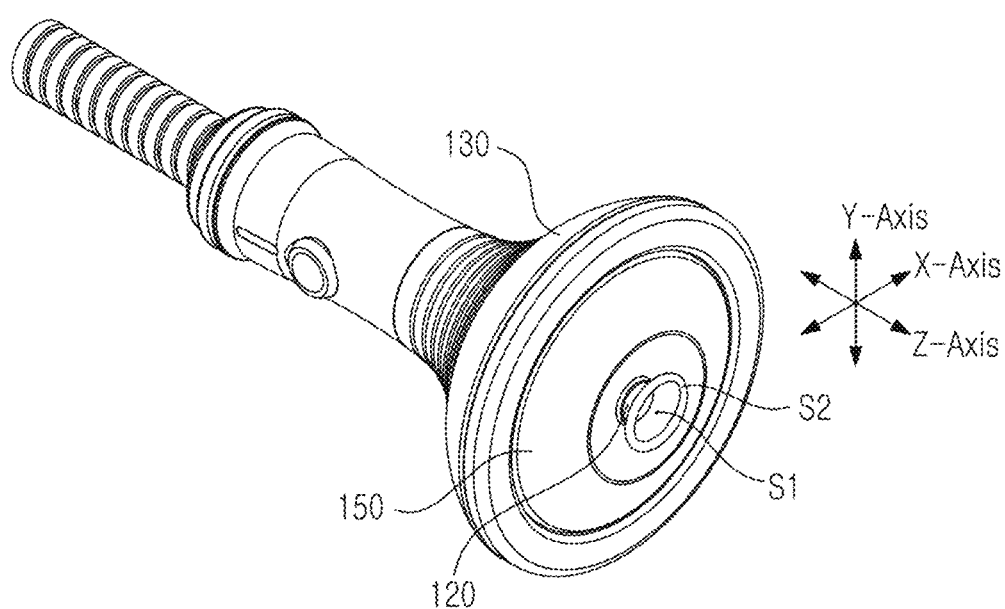
FIG. 6 is a perspective view for illustrating provision of the ultrasound stimulation area through the high-intensity focused ultrasound generator and the plurality of piezoelectric ceramic members in the multi-focal shockwave output handle unit for the extracorporeal shockwave therapy device according to the embodiment of the present invention.

Here, the ultrasonic waves generated by the piezoelectric ceramic members of the piezoelectric ceramic unit 140, which are adhesively arranged one by one on the front inner curved surface of the cover unit 130 or the rear outer curved surface of the radiation-surface base unit 150 of the spherical tube shape, pass through the radiation-surface base unit 150 and the gel pad unit 160, and form the ring-shaped second ultrasound stimulation area (S2) in a predetermined range with reference to multiple focuses on the front side by the curvature of the curved surface, as shown in FIG. 6.

To this end, when the plurality of piezoelectric ceramic members 141, 142, 143 and 144 are arranged in a plurality of rows from the front to the back on the front inner curved surface of the cover unit 130 or the rear outer curved surface of the radiation-surface base unit 150 of the spherical tube shape, a slope of a radiation angle at which ultrasonic waves are generated increases with respect to a plane where the second ultrasound stimulation area S2 is formed as the position of each piezoelectric ceramic member goes backwards.

Specifically, as shown in FIGS. 3 and 4, in comparing a slope (A1) of an ultrasound radiation angle of the first-row piezoelectric ceramic member 141 disposed at the front among the plurality of piezoelectric ceramic members 141 and 142, 143, and 144 with respect to the plane where the second ultrasound stimulation area (S2) is formed, a slope (A2) of an ultrasound radiation angle of the next second-row piezoelectric ceramic member 142 with respect to the plane where the second ultrasound stimulation area (S2) is formed, a slope (A3) of an ultrasound radiation angle of the next third-row piezoelectric ceramic member 143 with respect to the plane where the second ultrasound stimulation area (S2) is formed, and a slope (A4) of an ultrasound radiation angle of the fourth-row piezoelectric ceramic member 141 disposed at the rear is formed, it can be seen that the slopes gradually increase. With this arrangement, it is possible to provide the ring-shaped second ultrasound stimulation area (S2) formed within a predetermined range with respect to multiple focuses.

Here, it is preferable that the piezoelectric ceramic unit 140 is provided with 60 to 120 piezoelectric ceramic members, which are arranged in rows in a radial form on the front inner curved surface of the cover unit 130 or the rear outer curved surface of the radiation-surface base unit 150 of the spherical tube shape.

In addition, a maximum output voltage of the second ultrasound stimulation area (S2) provided by the piezoelectric ceramic unit 140 is set to be lower than a maximum output voltage of the first ultrasound stimulation area (S1) provided by the high-intensity focused ultrasonic generator 120, and preferably, is set to 20 mV to 105 mV.

For example, the maximum output voltage of the second ultrasound stimulation area (S2) provided by the plurality of piezoelectric ceramic unit 140 may be set to 10% to 40% of the maximum output voltage of the first ultrasound stimulation area (S1) provided by the high-intensity focused ultrasonic generator 120.

On the basis of the appropriate maximum output voltage ratio and range of the second ultrasound stimulation area (S2) with respect to the first ultrasound stimulation area (S1), the ring-shaped second ultrasonic stimulation (S2) formed by the piezoelectric ceramic unit 140 preferably has an outer diameter (D) of 5 mm to 30 mm and an inner diameter of 1 mm to 20 mm.

In this regard, an experiment was performed to measure an output voltage value using an oscilloscope by operating a driving circuit with an impulse output of about 4000V in a state where the multi-focal shockwave output handle unit 100 for the extracorporeal shockwave therapy device using the multi-piezoelectric configuration according to the present embodiment and a needle probe hydrophone were mounted in a water tank.

The measurement of the output voltage value was performed repeatedly while moving to X, Y, and Z axes in consideration of the ring shape of the second ultrasound stimulation area (S2) as shown in FIG. 6, and results thereof are shown in FIGS. 7 and 8.

Referring to FIG. 7, it was confirmed that the maximum output voltage from the piezoelectric ceramic unit 140, which was adhesively disposed on the front inner curved surface of the cover unit 130 or the rear outer curved surface of the radiation-surface base unit 150 of the spherical tube shape in the multi-focal shockwave output handle unit 100 for the extracorporeal shockwave therapy device using the multi-piezoelectric configuration according to the present embodiment, was measured as 80 mV, the outer diameter (D) on the X-axis and the Y-axis in the ring-shaped second ultrasound stimulation area S2 was measured as 24.7 mm, and the width at 50% of the maximum output voltage was measured as 5.7 mm.

Further, referring to FIG. 8, it was confirmed that the maximum output voltage from the piezoelectric ceramic unit 140, which was adhesively disposed on the front inner curved surface of the cover unit 130 or the rear outer curved surface of the radiation-surface base unit 150 of the spherical tube shape in the multi-focal shockwave output handle unit 100 for the extracorporeal shockwave therapy device using the multi-piezoelectric configuration according to the present embodiment, was measured as 80 mV, and a penetration depth that is a width at 50% of the maximum output voltage on the Z-axis of the ring-shaped second ultrasound stimulation area (S2) was measured as 13.5 mm.

As a comparison example, an experiment was performed to measure an output voltage value using an oscilloscope by operating a driving circuit with an impulse output of about 4000 V in a state where a conventional shockwave output handle unit for an extracorporeal shockwave therapy device and a needle probe hydrophone were mounted in a water tank, and results thereof are shown in FIGS. 9 and 10.

Referring to FIGS. 9 and 10, it was confirmed that a maximum output voltage with reference to a single focus in the conventional shockwave output handle unit for the extracorporeal shockwave therapy device was 260 mV, which shows that the maximum output voltage of 80 mV of the second ultrasound stimulation area (S2) in the multi-focal shockwave output handle unit 100 for the extracorporeal shockwave therapy device using the multi-piezoelectric configuration according to the present embodiment corresponds to 30.8% thereof, thereby making it possible to shallowly penetrate into an epidermal layer due to its low energy density, which is 10 to 40% of the maximum output voltage in the conventional device.

The control unit 170 is provided inside the handle 110, and performs a control for applying an electric signal for generating ultrasonic waves to at least one of the high-intensity focused ultrasound generator 120 or the piezoelectric ceramic unit 140.

The above-described embodiments are not intended to limit but illustrate the technical idea of the present invention, and the scope of the technical idea of the present invention is not limited by these exemplary embodiments. The scope of protection should be interpreted in accordance with claims below, and all technical ideas within the equivalent scope should be interpreted as being included in the scope of the invention.

The invention claimed is:

1. A multi-focal shockwave output handle unit for an extracorporeal shockwave therapy device using a multi-piezoelectric configuration, comprising:
   a high-intensity focused ultrasound generator that is provided on a front end part of a handle that is provided to be gripped by a user, and generates high-intensity focused ultrasound (HIFU) on the basis of an applied electric signal to form a first ellipsoidal ultrasound stimulation area in a predetermined range with reference to a single focus on a front side;
   a cover unit that is connected to the front end part of the handle in a state where the high-intensity focused ultrasound generator is inserted in a first insertion hole formed at a central part thereof, is provided in the form of a spherical tube with a predetermined curvature, and covers a side part of the high-intensity focused ultrasound generator inserted through the first insertion hole on the inside of a front part thereof;
   a radiation-surface base unit that is connected to a front end part of the cover unit in a state where the high-intensity focused ultrasound generator is inserted in a second insertion hole formed at a central part thereof, is provided in the form of a spherical tube with a predetermined curvature, and surrounds the side of the high-intensity focused ultrasound generator inserted through the second insertion hole on the inside of a front part thereof to form a predetermined space between a rear outer curved surface and a front inner curved surface of the cover unit;
   a piezoelectric ceramic unit that includes a plurality of piezoelectric ceramic members arranged on the front inner curved surface of the cover unit or the rear outer curved surface of the radiation-surface base unit having a spherical tube shape, and generates ultrasonic waves on the basis of an applied electric signal; and
   a gel pad unit that is connected to a front end part of the radiation-surface base unit in a state where the high-intensity focused ultrasound generator is inserted in a third insertion hole formed at a central part thereof, surrounds the side of the high-intensity focused ultrasound generator, and provides a skin contact surface at a front part thereof,
   wherein the ultrasonic waves generated by the plurality of piezoelectric ceramic members arranged on the front inner curved surface of the cover unit or the rear outer curved surface of the radiation-surface base unit of the spherical tube shape pass through the radiation surface base unit and the gel pad unit to form a ring-shaped second ultrasound stimulation area within a predetermined range with reference to multiple focuses on the front side by the curvature of the curved surface, wherein a maximum output voltage of the second ultrasound stimulation area formed through the ultrasound generation of the piezoelectric ceramic unit is set to be lower than a maximum output voltage of the first ultrasound stimulation area formed by the high-intensity focused ultrasonic generator, and wherein when the plurality of piezoelectric ceramic members are arranged in a plurality of rows from the front to the back on the front inner curved surface of the cover unit or the rear outer curved surface of the radiation-surface base unit of the spherical tube shape, a slope of a radiation angle at which ultrasonic waves are generated increases with respect to a plane where the second ultrasound stimulation area is formed as the position of each piezoelectric ceramic member goes backwards.

2. The multi-focal shockwave output handle unit according to claim 1, wherein the piezoelectric ceramic unit is provided with 60 to 120 piezoelectric ceramic members, which are arranged on the front inner curved surface of the cover unit or the rear outer curved surface of the radiation-surface base unit of the spherical shape.

3. The multi-focal shockwave output handle unit according to claim 1, wherein the curvature of the front inner curved surface of the cover unit or the rear outer curved surface of the radiation-surface base unit is set so that the ring-shaped second ultrasound stimulation area formed by the plurality of piezoelectric ceramic members arranged thereon has an outer diameter of 5 mm to 30 mm and an inner diameter of 1 mm to 20 mm.

4. The multi-focal shockwave output handle unit according to claim 3, wherein the maximum output voltage of the second ultrasound stimulation area formed through the ultrasound generation of the piezoelectric ceramic unit corresponds to 25 mV to 105 mV.

5. The multi-focal shockwave output handle unit according to claim 1, further comprising: a control unit that is provided inside the handle and performs a control for applying the electric signal for generating the ultrasonic waves to at least one of the high-intensity focused ultrasound generator or the piezoelectric ceramic unit.

* * * * *